United States Patent
Duan et al.

(10) Patent No.: US 12,294,280 B2
(45) Date of Patent: May 6, 2025

(54) INTEGRATED AXIAL FLUX MOTOR ASSEMBLIES INCLUDING PLANETARY GEARSETS

(71) Applicant: GM GLOBAL TECHNOLOGY OPERATIONS LLC, Detroit, MI (US)

(72) Inventors: Chengwu Duan, Shanghai (CN); Zhen Gao, Shanghai (CN); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 17/728,260

(22) Filed: Apr. 25, 2022

(65) Prior Publication Data

US 2023/0283145 A1    Sep. 7, 2023

(30) Foreign Application Priority Data

Mar. 4, 2022 (CN) .......................... 202210205908.0

(51) Int. Cl.
| | |
|---|---|
| H02K 7/116 | (2006.01) |
| H02K 1/276 | (2022.01) |
| H02K 1/2793 | (2022.01) |
| H02K 5/173 | (2006.01) |

(52) U.S. Cl.
CPC ............ H02K 7/116 (2013.01); H02K 1/276 (2013.01); H02K 1/2793 (2013.01); H02K 5/1735 (2013.01)

(58) Field of Classification Search
CPC .... H02K 7/116; H02K 1/2793; H02K 1/2796; H02K 1/2798
USPC ......................................................... 310/149
See application file for complete search history.

(56) References Cited

U.S. PATENT DOCUMENTS

| | | | | |
|---|---|---|---|---|
| 6,278,216 | B1 * | 8/2001 | Li ........................... | B60L 50/20 310/67 A |
| 7,445,067 | B2 * | 11/2008 | Marsh .................. | B60K 17/046 310/83 |
| 8,339,010 | B2 * | 12/2012 | Atarashi ................ | H02K 16/02 310/156.53 |
| 2013/0147291 | A1 * | 6/2013 | Woolmer ................. | H02K 9/28 310/58 |
| 2016/0156248 | A1 * | 6/2016 | Lueker ................... | H02K 7/116 310/83 |
| 2019/0376581 | A1 * | 12/2019 | Avery ..................... | B60K 17/08 |

FOREIGN PATENT DOCUMENTS

CN            208623519 U    *    3/2019    ............... H02K 1/14

OTHER PUBLICATIONS

Translation of CN 208623519 U (Year: 2019).*

* cited by examiner

*Primary Examiner* — Terrance L Kenerly
*Assistant Examiner* — Theodore L Perkins

(57) ABSTRACT

An axial flux motor includes: a ring-shaped stator, a ring-shaped rotor and a planetary gear set. The ring-shaped stator includes a stator core and segments arranged on the stator core, where each of the segments includes a laminated stack and windings wrapped around the laminated stack. The ring-shaped rotor defines an inner open area and including a body and permanent magnets arranged on the body adjacent to and spaced from the segments. The planetary gear set is disposed within the inner open area and configured to receive an input torque from the rotor and provide an output torque, which is greater than the input torque.

10 Claims, 10 Drawing Sheets

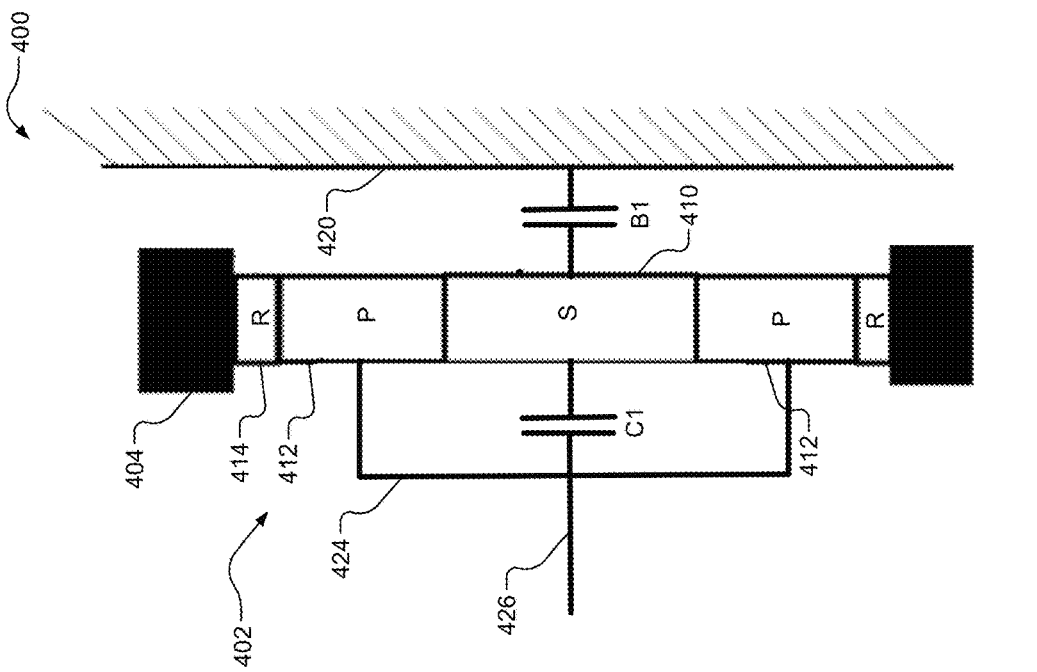
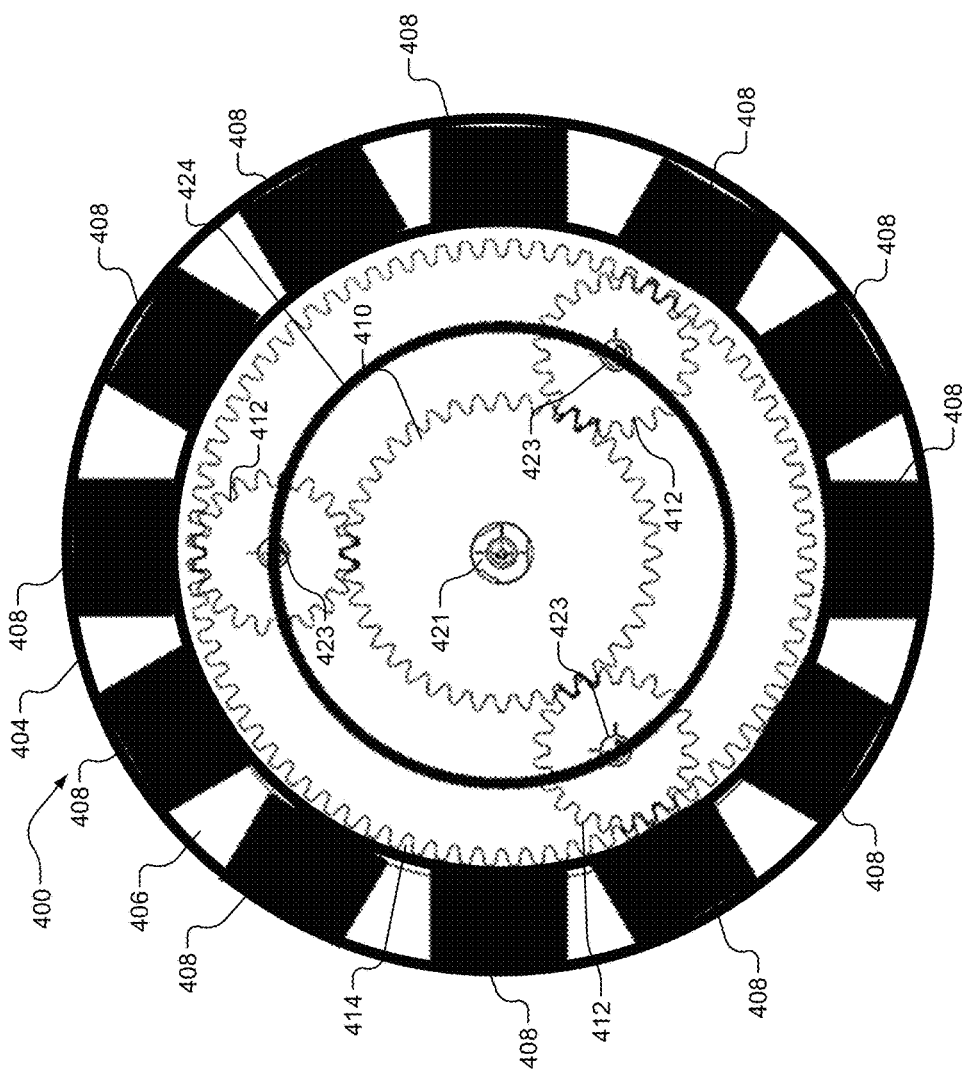

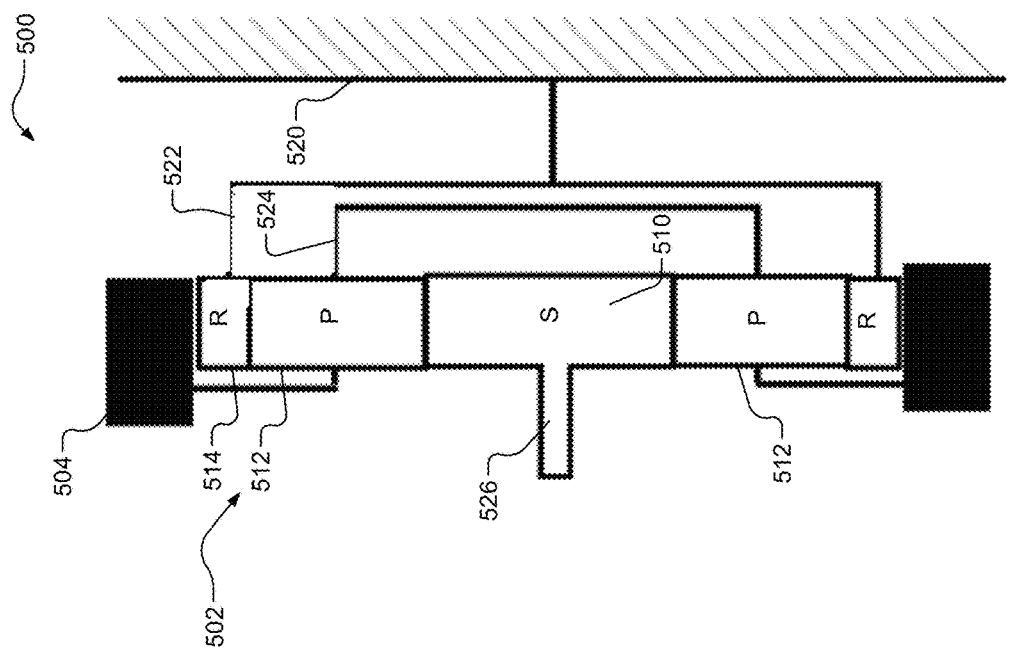
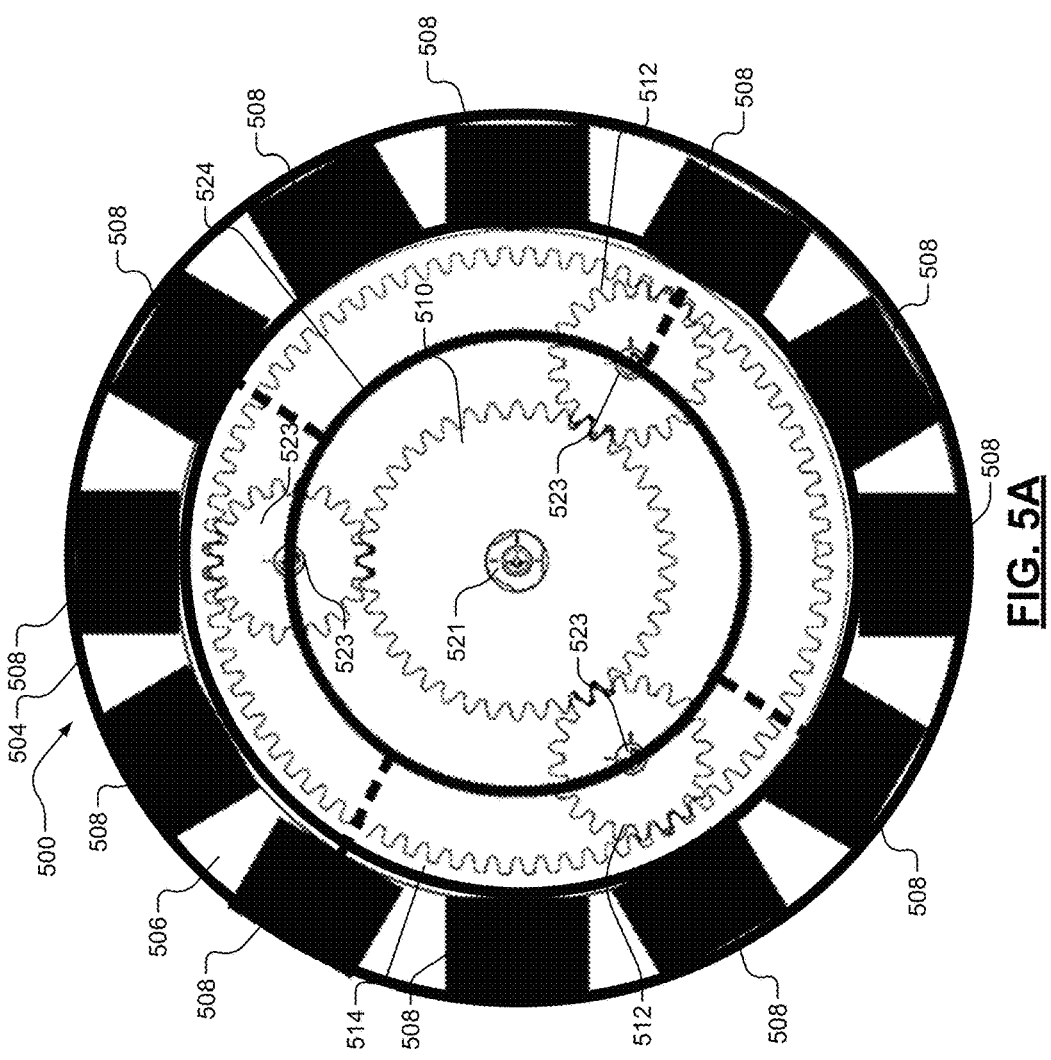

INTEGRATED AXIAL FLUX MOTOR ASSEMBLIES INCLUDING PLANETARY GEARSETS

CROSS-REFERENCE TO RELATED APPLICATIONS

This application claims the benefit of Chinese Patent Application No. 202210205908.0, filed on Mar. 4, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to axial flux motor assemblies.

Electric motors convert electrical energy into mechanical work by the production of torque, while electric generators convert mechanical work to electrical energy. Electric vehicles and hybrid vehicles employ electric motors/generators, such as induction and permanent magnet motors/generators for propulsion and to capture braking energy. Although motors are primarily referred to herein, the principles described herein are also applicable to generators.

An electric motor may include a rotor and a stator. The rotor includes permanent magnets and rotates relative to the stator. The rotor is separated from the stator by an air gap. The stator includes conductors in the form of wire windings. When electrical current is passed through the wire windings, a magnetic field is generated having an associated magnetic flux. Power is transferred over the air gap as a result of the magnetic field acting on the permanent magnets of the rotor. As a result, electrical energy is converted to mechanical energy to rotate the rotor. In an electric vehicle, the rotor may be used to transfer torque via a rotating shaft connected to the rotor through a gear set to drive wheels of the vehicle.

Two types of electric motors are radial flux motors and axial flux motors. In a radial flux motor, the rotor and stator are typically situated in a concentric or nested configuration, such that when the stator is energized, a magnetic flux is created that extends radially from the stator to the rotor. Conductive windings of the stator are typically arranged parallel to an axis of rotation such that a magnetic field is generated, which is oriented in a radial direction from the axis of rotation along the rotor shaft. In an axial flux motor, a magnetic field parallel to an axis of rotation is produced by the electrically conductive wire windings of the corresponding stator. Magnetic flux created in the axial flux motor extends parallel to an axis of rotation of the rotor shaft. Axial flux motors tend to be smaller, lighter, and generate more power than radial flux motors.

SUMMARY

An axial flux motor is disclosed and includes: a ring-shaped stator including a stator core and segments arranged on the stator core, where each of the segments includes a laminated stack and windings wrapped around the laminated stack; a ring-shaped rotor defining an inner open area and including a body and permanent magnets arranged on the body adjacent to and spaced from the segments; and a planetary gear set disposed within the inner open area and configured to receive an input torque from the rotor and provide an output torque, which is greater than the input torque.

In other features, a ratio between an inner diameter of the ring-shaped stator and an outer diameter of the ring-shaped stator is greater than 0.6.

In other features, a ratio between an inner diameter of the ring-shaped rotor and an outer diameter of the ring-shaped rotor is greater than 0.6.

In other features, each of the laminated stacks has laminated layers. At least one of: the laminated layers of at least one of the laminated stacks have the same dimensions; or a radial cross-section of one or more of the laminated stacks is rectangular-shaped.

In other features, the axial flux motor further includes a housing including a cage configured to hold the stator in a fixed location relative to the housing.

In other features, each layer of the laminated stacks includes 3.2% silicon steel.

In other features, the planetary gear set includes a sun gear, planetary gears and a ring gear. The sun gear is at least one of fixed or connected to a housing of the axial flux motor. The planetary gears are configured to rotate around the sun gear and are coupled to an output shaft via a carrier and bearings. The ring gear is coupled to the rotor.

In other features, the axial flux motor further includes a housing, a brake and a clutch. The planetary gear set includes a sun gear, planetary gears and a ring gear. The sun gear is connected to the housing via the brake and is connected to an output shaft via the clutch. The planetary gears are configured to rotate around the sun gear and are coupled to the output shaft via a carrier and bearings. The ring gear is coupled to the rotor.

In other features, the planetary gear set includes a sun gear, a planetary gears and a ring gear. The sun gear is connected to an output shaft. The planetary gears are configured to rotate around the sun gear and are coupled to the rotor via a carrier and bearings. The ring gear is at least one of fixed or connected to a housing of the axial flux motor.

In other features, the axial flux motor further includes a housing, a brake and a clutch. The planetary gear set includes a sun gear, the planetary gears and a ring gear. The sun gear is connected to an output shaft and is connected to the planetary gears via the clutch and bearings. The planetary gears are configured to rotate around the sun gear and are coupled to the rotor via a carrier and the bearings. The ring gear is connected to a housing of the axial flux motor via the brake.

In other features, the planetary gear set includes a sun gear, planetary gears and a ring gear. The sun gear is at least one of fixed or connected to a housing of the axial flux motor. The planetary gears are configured to rotate around the sun gear and are coupled to the rotor via a first carrier and bearings. The ring gear is connected to an output shaft via a second carrier.

In other features, the axial flux motor further includes a housing, a brake and a clutch. The planetary gear set includes a sun gear, planetary gears and a ring gear. The sun gear is connected to a housing of the axial flux motor via the brake and connected to a first carrier via the clutch. The planetary gears are configured to rotate around the sun gear and are coupled to the rotor via a second carrier and bearings. The ring gear is connected to an output shaft via a third carrier.

In other features, an axial flux motor is disclosed and includes: a ring-shaped stator including segments defining a first inner open area; a ring-shaped rotor defining a second inner open area and including permanent magnets adjacent to and spaced from the segments, where the ring-shaped rotor is configured to rotate about a central axis extending through a center of the first inner open area and the second inner open area; and a planetary gear set disposed within the inner open area and configured to receive an input torque from the rotor and provide an output torque, which is greater than the input torque.

In other features, the planetary gear set includes a sun gear, planetary gears, and a ring gear. The sun gear is fixed to a housing of the axial flux motor. The ring gear is connected to an output shaft and provides the output torque.

In other features, the planetary gear set includes a sun gear, planetary gears, and a ring gear. The ring gear is fixed to a housing of the axial flux motor. The sun gear is connected to an output shaft and provides the output torque.

In other features, the planetary gear set includes a sun gear, planetary gears, and a ring gear. The sun gear or the ring gear is connected to a housing of the axial flux motor via a brake.

In other features, the planetary gear set includes a sun gear, planetary gears, and a ring gear. The sun gear or the ring gear is connected to an output shaft via a clutch.

In other features, the planetary gear set includes a sun gear, planetary gears, and a ring gear. The ring gear or the planetary gears is coupled to the rotor.

In other features, the planetary gear set includes a sun gear, planetary gears, and a ring gear. The sun gear is connected to the planetary gears via a clutch.

In other features, the planetary gear set includes a sun gear, planetary gears, and a ring gear. The sun gear is connected to a brake or a housing of the axial flux motor via a connector. The planetary gears are coupled to the rotor via a carrier that rotates about the connector.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A is a front end view of an example of a portion of an axial flux motor assembly including a dual-speed planetary gear set with a ring gear fixed to a rotor in accordance with the present disclosure;

FIG. 4B is a side cross-sectional view of the portion of the axial flux motor assembly of FIG. 4A;

FIG. 5A is a front end view of an example of a portion of an axial flux motor assembly including a single speed planetary gear set with a carrier fixed to a rotor and a sun gear providing motor output torque in accordance with the present disclosure;

FIG. 5B is a side cross-sectional view of the portion of the axial flux motor assembly of FIG. 5A;

In the drawings, reference numbers may be reused to identify similar and/or identical elements.

DETAILED DESCRIPTION

Figure 1B:
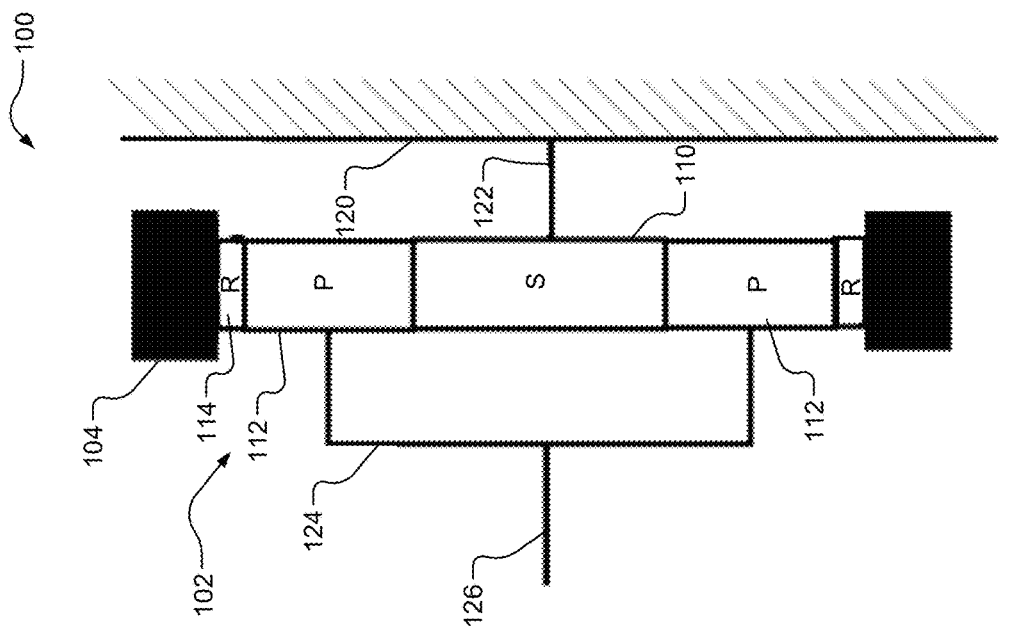
FIG. 1B is a side cross-sectional view of the portion of the axial flux motor assembly of FIG. 1A.

An axial flux motor may include a stator and one or more rotors. The stator may include a stator core including stator core segments (referred to herein as "segments") about which electrically conductive windings (or wound conductive wire) is wrapped. The stator core segments may be partially or purely formed of a steel alloy. The segments may be trapezoidal shaped and at least partially be formed of soft magnetic composite (SMC) material and/or a ferromagnetic material.

Segments formed of SMC material may have surfaces that are covered with an electrically insulating layer. The SMC material may be in the form of a SMC powder and include an iron powder having fine particles that are able to be molded into a predetermined shape using a press. The particles may be coated with insulative material. Pressure introduced by the press causes the particles to bind together. These powders are consolidated to form soft-magnetic components by means of pressing or consolidation. Stators formed of SMC material tend to exhibit high eddy current losses.

Segments of a stator may be formed of laminated layers of magnetic material that each include a ferromagnetic material, such as magnetic steel. The ferromagnetic material of each of the layers may be isolated from each other by insulative coats. As an example, each of the layers may include a magnetic material layer that is coated with an insulative and/or dielectric material. An insulative material is disposed between two adjacent magnetic material layers.

The laminated layers may be laminated steel sheets that are stacked, pressed, punched, annealed, and/or adhered to each other during a manufacturing process to form a laminated stator core tooth. When multiple laminated stator core teeth are assembled, the teeth provide magnetizable poles.

Hybrid segments include both SMC material and laminated magnetic steel stacked layers, referred to as laminated layered blocks. The more laminated content of each segment, the less core loss and the better the operating efficiency of the motor. Stators including hybrid segments may include segments with triangular-shaped cross sections (or triangular-shaped end views). The stators typically have a low inner diameter (I.D.) to outer diameter (O.D.) ratio (e.g., less than 0.6).

Segments including laminated stacks with triangular-shaped cross sections (or triangular-shaped end views) tend to be difficult and expensive to manufacture because of the sizes of the layers of each segment increasing from the inner diameter to the outer diameter. The innermost layer has the smallest surface area and the outermost layer has the largest surface area. A segment can include hundreds of laminated layers stacked from the inner diameter to the outer diameter.

The examples set forth herein include axial-flux motor assemblies including (i) axial flux motors with ring-shaped rotors and stators having large inner to outer diameter ratios (e.g., greater than 0.6), and (ii) integrated planetary gear sets. The rotors have large inner diameters that accommodate inner mounted planetary gear sets, which can provide increased output torque as compared to traditional axial flux motors without planetary gear sets. The inclusion of the planetary gear sets allows the sizes of the permanent magnets to be reduced, which allows for the inner diameter to outer diameter ratios of the rotors to be increased. In addition, the sizes of the segments of the stators are able to be reduced and the shapes of the cross-sections (or end views) of the segments may be rectangular or square-shaped. The layers of each of the segments are the same size and shape, which reduces manufacturing costs. In an embodiment, all of the layers of all of the segments of the stator have the same length, width and depth dimensions. In another embodiment, some of the segments of the stator have the same length, width and depth dimensions.

In another embodiment, a stator is provided that includes a first one or more segments and a second one or more segments. The first one or more segments have layers with the same length, width and depth dimensions. The second one or more segments have layers with the same length, width and depth dimensions. The dimensions of the first one or more segments have layers with different dimensions than a second one or more segments.

The examples include single speed and dual speed embodiments. The single speed embodiments include fixed sun or planetary gears. The dual speed embodiments include clutches and brakes to provide different gear ratios.

Figure 1A:
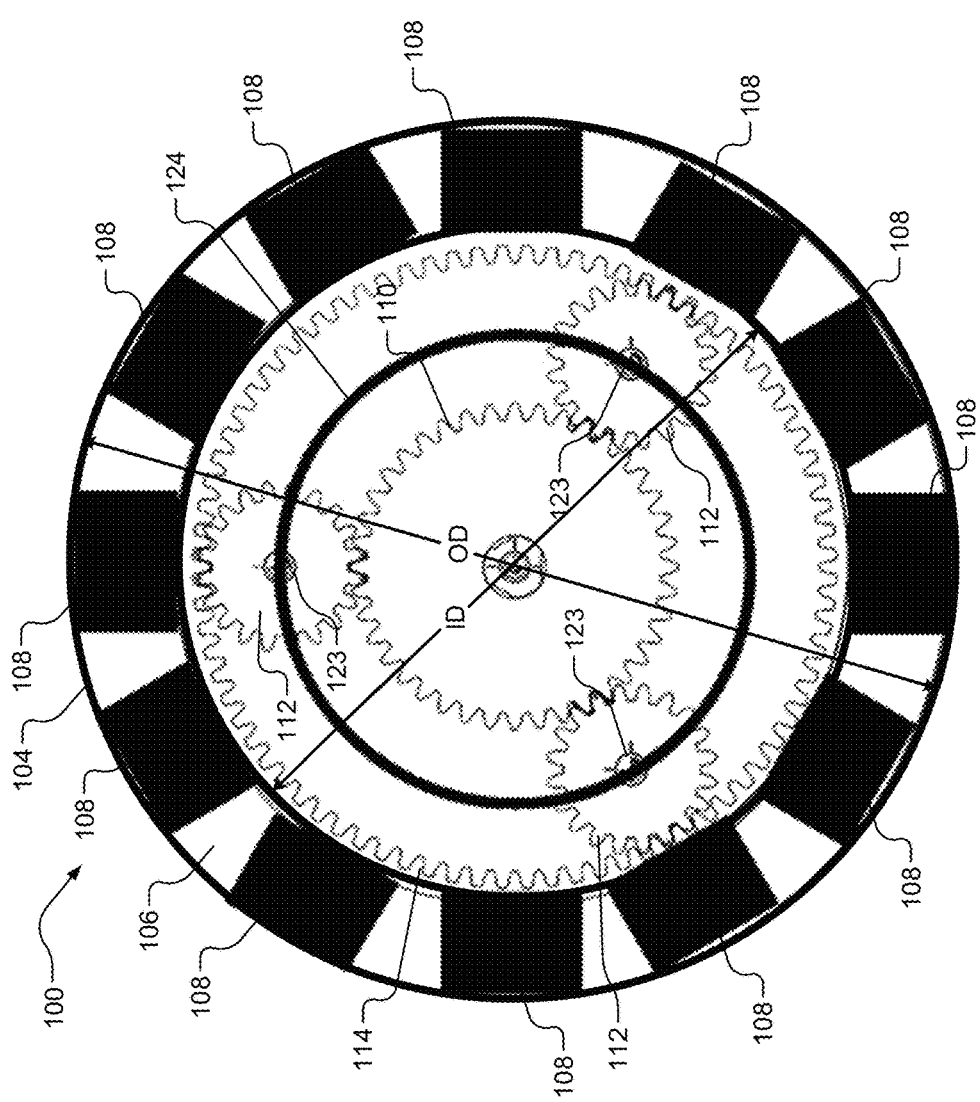
FIG. 1A is a front end view of an example of a portion of an axial flux motor assembly including a single speed planetary gear set in accordance with the present disclosure.

FIGS. 1A-1B show a portion 100 of an axial flux motor assembly including a single speed planetary gear set 102 implemented within an inner open area of a rotor 104. The rotor 104 includes an annular (or ring-shaped) body 106 and permanent magnets 108 mounted on the annular body 106. The planetary gear set 102 receives input torque from the rotor 104 and provides output torque that is greater than the input torque. The planetary gear set 102 includes a sun gear 110, planetary gears (e.g., three planetary gears) 112 and a ring gear 114.

The sun gear 110 is fixed in this example to, for example, a housing 120 via a connector 122. The planetary gears 112 rotate on bearings 123 and about the sun gear 110. The planetary gears 112 include radially outward extending teeth that engage with radially outwardly extending teeth of the sun gear 110. A carrier 124 is attached to the planetary gears 112 and includes an output 126, which outputs torque based on the gear ratio provided by the planetary gear set 102. The ratio being the speed of the rotor 104 relative to the speed of the carrier 124 and output 126. In the example shown, the carrier 124 includes a ring that is connected to the bearings 123 of the planetary gears 112.

The ring gear 114 is coupled to the rotor 104 and rotates about the planetary gears 112 and the sun gear 110. The ring gear 114 has inwardly extending teeth that engage with the teeth of the planetary gears 112. The ring gear 114 may be rigidly fixed to and/or integrally formed as part of the rotor 104. In one embodiment, the ring gear 114 is coupled to the rotor 104 via a spline connection and/or teeth. The ring gear 114 rotates at a same speed as the rotor 104.

The rotor 104 has an inner diameter ID and an outer diameter OD. The ratio of the inner diameter to the outer diameter is greater than 0.6. In one embodiment, the ratio is between 0.6 and 0.9 (or greater than 0.6 and less than or equal to 0.9). In another embodiment, the ratio is between 0.7 and 0.9±0.05. The other rotors disclosed herein may have the same or similar inner to outer diameter ratios.

Figure 2:
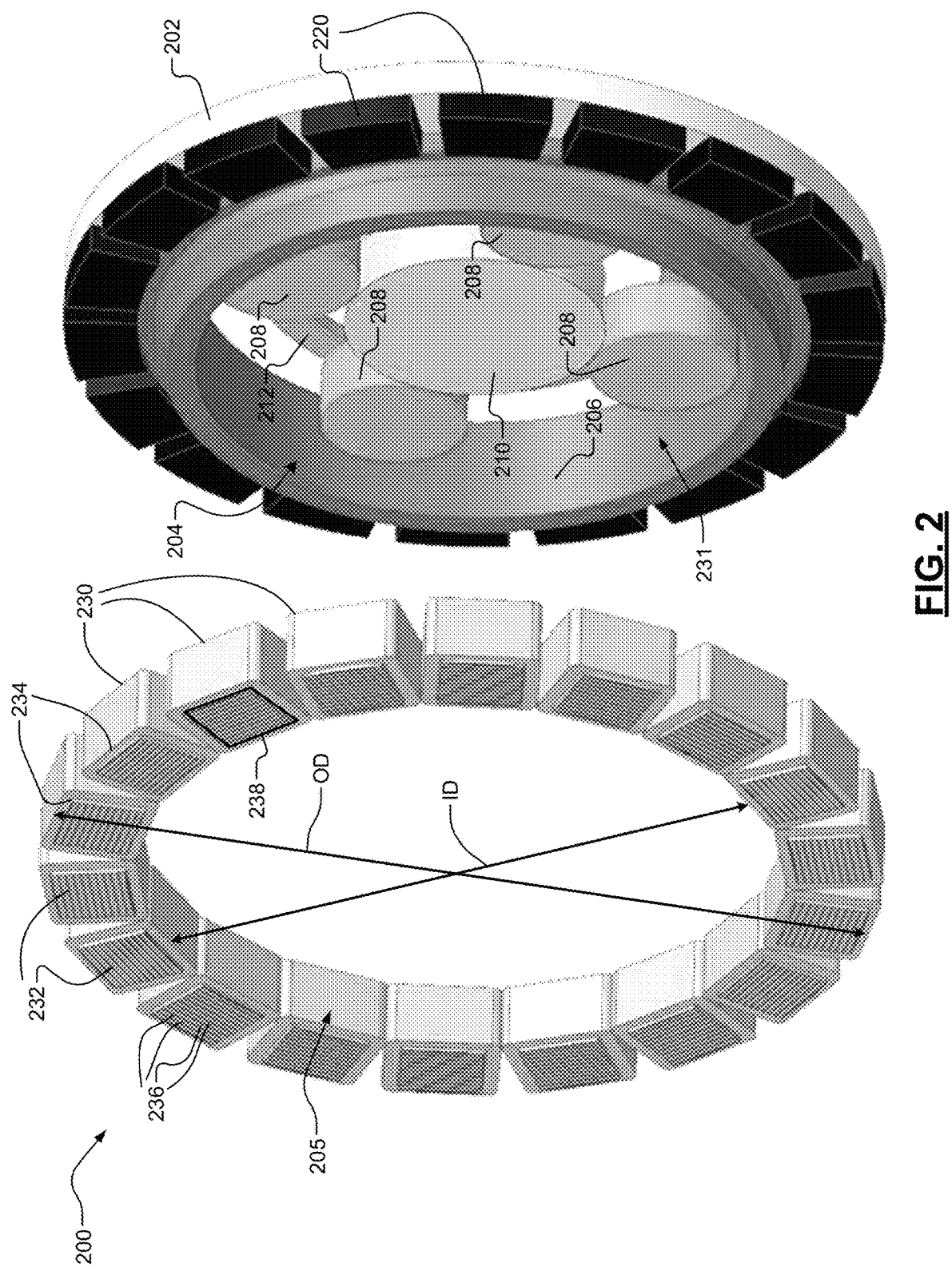
FIG. 2 is a perspective view of an example stator, an example rotor and an example planetary gear set of an axial flux motor assembly in accordance with the present disclosure.
Figure 3:
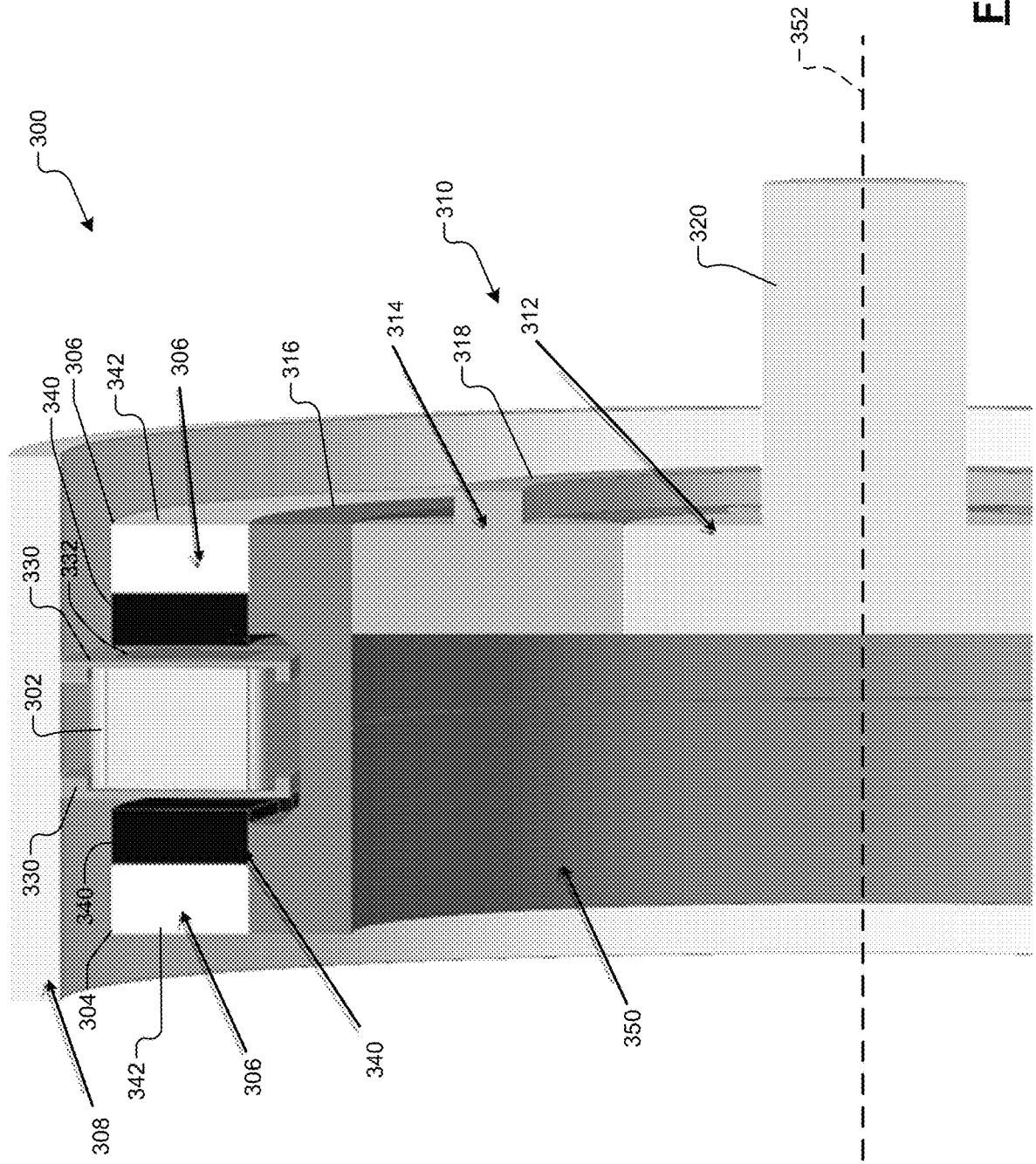
FIG. 3 is a cross-sectional view of a portion of an axial flux motor assembly in accordance with the present disclosure.

FIG. 2 shows an example stator 200, an example rotor 202 and an example planetary gear set 204 of an axial flux motor assembly. The rotor 202 defines a first inner open area 205 in which the planetary gear set 204 is disposed. The planetary gear set 204 includes a ring gear 206, planetary gears 208 and sun gear 210. Bearings (not shown in FIG. 2) of the planetary gears 208 are connected via a carrier 212. Although the planetary gear set 204 is shown having four planetary gears, the planetary gear set may include a different number of planetary gears (e.g., three planetary gears). In FIGS. 2-3, the rotor 202, ring gear 206, planetary gears 208 and sun gear 210 are not shown with teeth. However, each of these gears may have teeth, as further described for this embodiment and other embodiments disclosed herein. The ring gear 206 may be integrally formed as part of the body of the rotor 202 as shown or may be connected to the body of the rotor 202. The rotor 202 includes permanent magnets 220.

The stator 200 includes segments 230 defining a second inner open area 231 and including laminated stacks 232 and wire 234 wound around the laminated stacks 232. Numerous windings are wound around each of the laminated stacks 232. Each of the laminated stacks includes multiple laminated layers, some of the layers of one of the laminated stacks are designated 236. In the example, shown, the layers of each of the laminated stacks 232 have the same dimensions. In an embodiment, all of the layers of the laminated stacks 232 have the same dimensions. The sides of the laminated stacks 232 may be square or rectangular shaped. The windings define square or rectangular-shaped areas filled by the laminated stacks 232. A square-shaped box 238 is shown to highlight as an example, the square-shape of one of the laminated stacks 232. The permanent magnets 220 may also be square or rectangular-shaped and may have the same or similar radial outer cross-sectional dimensions as the laminated stacks 232 and/or segments 230.

Although shown as having the same dimensions, the laminated stacks 232 may have different dimensions. Each of the layers of the laminated stacks 232 may be formed of silicon steel (e.g., 6.5% silicon steel or 3.2% silicon steel). 6.5% silicon steel includes up to 6.5% silicon and 93.5% or more iron. 3.2% silicon steel includes up to 3.2% silicon and 96.8% or more iron. The percentages may refer to mass percentages or mass/volume percentages.

The stator 200 has an inner diameter ID and an outer diameter OD. The ratio of the inner diameter to the outer diameter is greater than 0.6. In one embodiment, the ratio is between 0.6 and 0.9 (or greater than 0.6 and less than or equal to 0.9). In another embodiment, the ratio is between 0.7 and 0.9, +0.05. The other rotors disclosed herein may have the same or similar inner to outer diameter ratios.

FIG. 3 shows a portion 300 of an axial flux motor assembly that includes a stator 302 and rotors 304, 306 located within a housing 308. The stator 302 may be configured similarly as the stator 200 of FIG. 2. The rotors 304, 306 may be configured similarly as the rotor 202 of FIG. 2. A planetary gear set 310 may be implemented within one of the rotors 304, 306. The planetary gear set 310 includes a sun gear 312, planetary gears 314, and a ring gear 316. Bearings (not shown in FIG. 3) of the planetary gears 314 may be connected to a carrier 318. The planetary gear set 310 may be configured similarly as any of the planetary gear sets disclosed herein. The sun gear 312, as shown in FIG. 3, may provide output torque via an output shaft 320.

The housing 308 may include radially inward extending flanges 330 between which the stator 302 is held in place. The flanges 330 may collectively be referred to as a cage and have openings as shown in which laminated stacks 332 engage and lock in place. The rotors 306 include permanent magnets 340 that are disposed between (i) annular bodies of 342 of the rotors 306 and (ii) the stator 302.

The examples disclosed herein are applicable to this style axial flux motor and other axial flux motors. For example, although two rotors are shown, an axial flux motor may include one or more rotors. Both of the rotors 306 are annular shaped with a centrally disposed opening 350. The planetary gear set 310 is disposed in the opening and the output shaft 320 defines an axis-of-rotation 352 about which the rotors 306, the ring gears 316, the planetary gears 314 and/or the sun gear 312 rotate. The axis-of-rotation 352 may extend along and/or include a longitudinal centerline of the output shaft 320.

The stator 302 is fixed and stationary relative to the housing 308, while the rotors 306 rotate during operation with the output shaft 320. Air gaps exist between (i) the permanent magnets 340 and (ii) the laminated stacks 332 and the flanges 330.

Although the axial flux motor is shown to have a central single stator 302 and two external rotors 306, the examples disclosed herein are also applicable to other configurations. Some example axial flux motor configurations include (i) two stators and a single rotor, or (ii) a single stator and two or more rotors. The axial motors may include respective housings and the corresponding rotors, stators and shafts may be disposed within the housings. The housings may be fixed to a vehicle frame and the shaft may be coupled to one or more axles, a gearbox (e.g., a reduction gearbox), another shaft, etc. of a corresponding vehicle.

The stator 302 includes a stator core including stator core segments (referred to herein as "segments") about which electrically conductive windings (or wound conductive wire) are wrapped. The windings are electrically conductive and may include copper, copper alloys, and/or other conductive materials. The electrically conductive windings are configured to generate a magnetic field when current is applied to interact with magnetic fields of the permanent magnets 340. Different regions of the stator 302 may be selectively energized to impart a rotational force on the rotors 306 causing the rotors 306 to rotate with respect to the axis-of-rotation 352.

The axial flux motor provides a high-torque output and thus is applicable to high-torque applications, including for use in an electric or hybrid vehicle. In such a variation, a housing encasing the motor may be attached to the vehicle frame and at least one output from an end of the output shaft 320 may be coupled to a reduction gearbox or directly to vehicle drive wheels.

FIGS. 4A-4B show a portion 400 of an axial flux motor assembly that is similar to the portion 100 of FIG. 1. The axial flux motor assembly includes a dual-speed planetary gear set 402 implemented within an inner open area of a rotor 404. The rotor 404 includes an annular (or ring-shaped) body 406 and permanent magnets 408 mounted on the annular body 406. The planetary gear set 402 receives input torque from the rotor 404 and provides output torque that is greater than the input torque. The planetary gear set 402 includes a sun gear 410, planetary gears (e.g., three planetary gears) 412 and a ring gear 414. The ring gear 414 is fixed to the rotor 404.

The sun gear 410 is connected to a brake B1, which is in turn connected to a housing 420. The sun gear 410 is also connected to the output 426 via a clutch C1. The sun gear 410 rotates on a bearing 421. The planetary gears 412 rotate on bearings 423 and about the sun gear 110. The planetary gears 112 include radially outward extending teeth that engage with radially outwardly extending teeth of the sun gear 410. A carrier 424 is attached to the bearings 423 of the planetary gears 412 and includes an output 426, which outputs torque based on the gear ratio provided by the planetary gear set 402. The ratio being the speed of the rotor 404 relative to the speed of the carrier 424 and output 426. In the example shown, the carrier 424 includes a ring that is connected to the bearings 423 of the planetary gears 412.

The ring gear 414 is coupled to the rotor 404 and rotates about the planetary gears 412 and the sun gear 410. The ring gear 414 has inwardly extending teeth that engage with the teeth of the planetary gears 412. The ring gear 414 may be rigidly fixed to and/or integrally formed as part of the rotor 404. In one embodiment, the ring gear 414 is coupled to the rotor 404 via a spline connection and/or teeth. The ring gear 414 rotates at a same speed as the rotor 404.

TABLE 1

States for planetary gear set of FIG. 4.

|  | C1 | B1 |
|---|---|---|
| 1rst Gear |  | X |
| 2nd Gear | X |  |

Table 1 identifies two states of the planetary gear set 402, which are provided by engaging the brake B1 or the clutch C1. Either the brake B1 or the clutch C1 is engaged, not both. When the brake B1 is engaged, the planetary gear set 402 is in a first gear having a first gear ratio. The sun gear 410 is fixed to the housing 420 when the brake B1 is fully engaged. The first gear is associated with a low speed high output torque range. When the clutch C1 is engaged, the planetary gear set 402 is in a second gear having a second gear ratio. The bearing 421 of the sun gear 410 is fixed to the carrier 424 and the output 426 when the clutch C1 is fully engaged. The second gear is associated with higher speeds and lower output torques than the first gear.

The brake B1 may be a binary type brake. The clutch C1 may be a binary type clutch, a low loss clutch, a friction plate clutch, and/or a dog clutch. A binary clutch referring to a clutch that is either fully disengaged or fully engaged. A friction plate clutch referring to a clutch that has infinite variability in speed and may synchronize speed before becoming fully engaged. The other brakes and clutches referred to herein may be configured similarly as the brake B1 and clutch C1.

FIGS. 5A-5B show a portion 500 of an axial flux motor assembly including a single speed planetary gear set 502 implemented within an inner open area of a rotor 504. The rotor 504 includes an annular (or ring-shaped) body 506 and permanent magnets 508 mounted on the annular body 506. The planetary gear set 502 receives input torque from the rotor 504 and provides output torque that is greater than the input torque. The planetary gear set 502 includes a sun gear 510, planetary gears (e.g., three planetary gears) 512 and a ring gear 514.

The sun gear 510 is fixed in this example to an output shaft 526 and is rotated by the planetary gears 512 on a bearing 521 to provide output torque. The ring gear 514 is fixed to a housing 520 via a second carrier 522. The planetary gears 512 rotate on bearings 523 and about the sun gear 510. The planetary gears 512 include radially outward extending teeth that engage with radially outwardly extending teeth of the sun gear 510. A carrier 524 is connected to the bearings 523 of the planetary gears 512 and is fixed to the rotor 504. In the example shown, the carrier 524 includes a ring that is connected to the bearings 523 of the planetary gears 512. The carrier 524 may be in two parts; a first part connecting the rotor 504 to the planetary gears 512 and a second part connected the planetary gears 512 to the clutch C1. The planetary gear set 502 provides a gear ratio that is the speed of the rotor 504 relative to the speed of the carrier 524 and output shaft 526.

The ring gear 514 is not coupled to the rotor 504 and does not rotate about the planetary gears 512 and the sun gear 510. The ring gear 514 has inwardly extending teeth that engage with the teeth of the planetary gears 512.

Figure 6B:
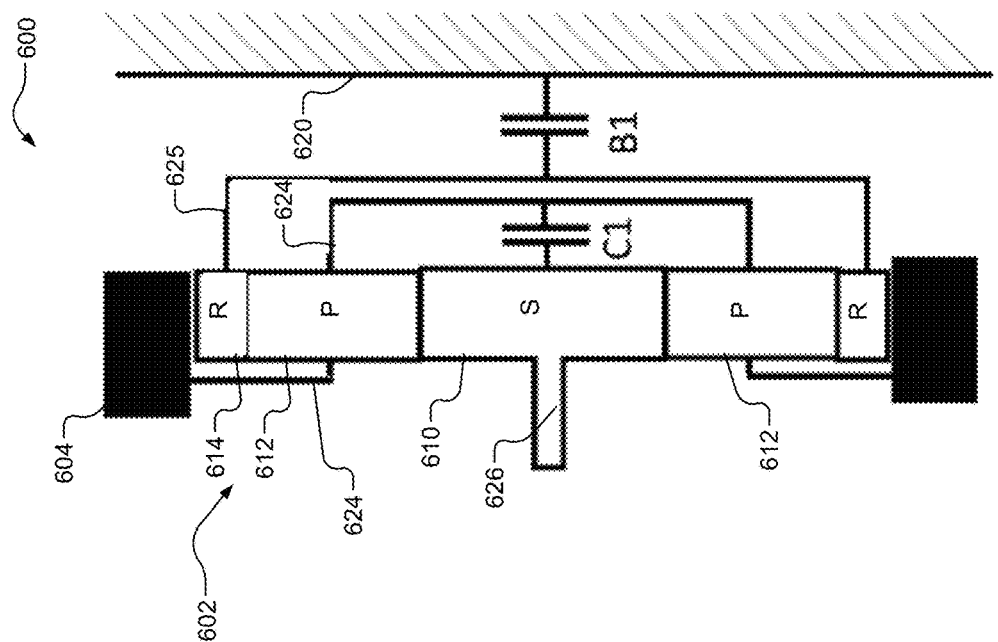
FIG. 6B is a side cross-sectional view of the portion of the axial flux motor assembly of FIG. 6A.
Figure 6A:
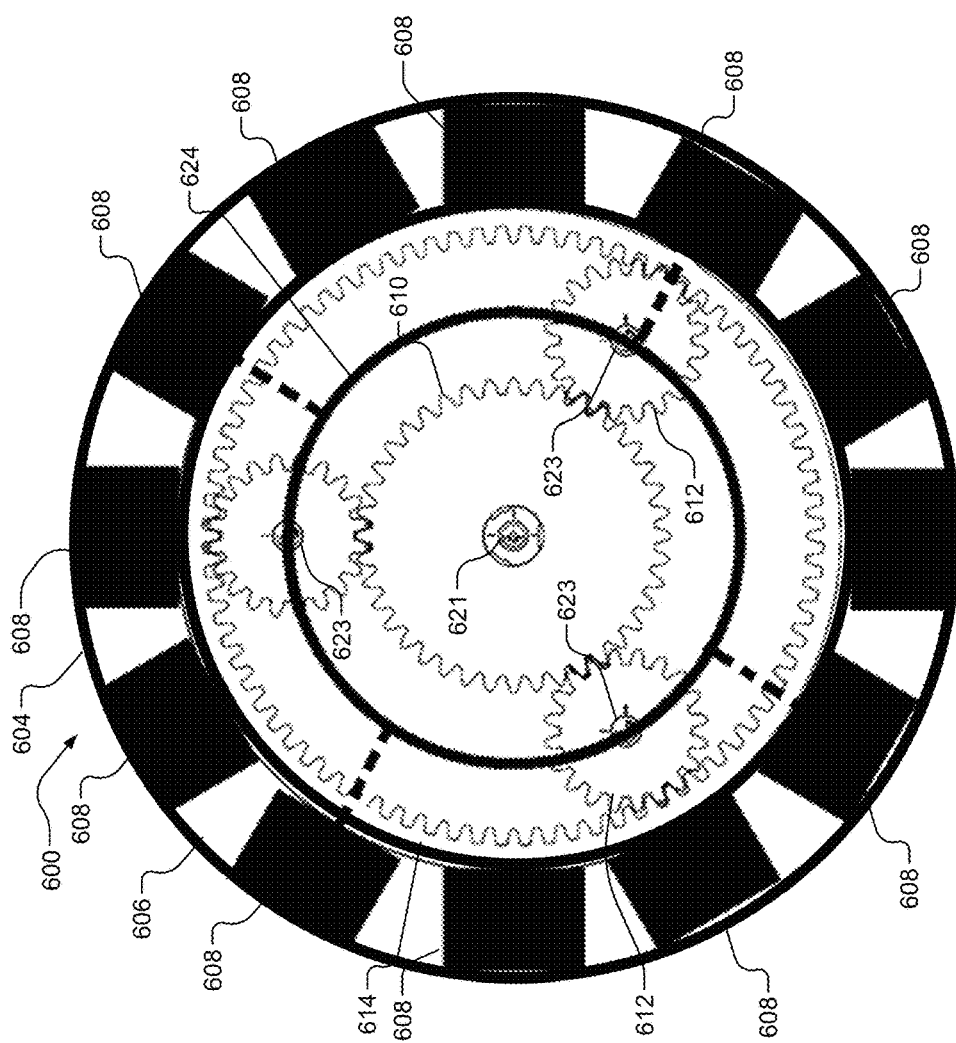
FIG. 6A is a front end view of an example of a portion of an axial flux motor assembly including a dual-speed planetary gear set with a carrier fixed to a rotor and a sun gear providing motor output torque in accordance with the present disclosure.

FIGS. 6A-6B show a portion 600 of an axial flux motor assembly that is similar to the portion 500 of FIG. 5. The axial flux motor assembly includes a dual-speed planetary gear set 602 implemented within an inner open area of a rotor 604. The rotor 604 includes an annular (or ring-shaped) body 606 and permanent magnets 608 mounted on the annular body 606. The planetary gear set 602 receives input torque from the rotor 604 and provides output torque that is greater than the input torque. The planetary gear set 602 includes a sun gear 610, planetary gears (e.g., three planetary gears) 612 and a ring gear 614.

The sun gear 610 is fixed in this example to an output shaft 626 and is rotated by the planetary gears 612 on a bearing 621 to provide output torque. The ring gear 614 is connected to a housing 620 via a brake B1. The planetary gears 612 rotate on bearings 623 and about the sun gear 610. The planetary gears 612 include radially outward extending teeth that engage with radially outwardly extending teeth of the sun gear 610. A carrier 624 is connected to the bearings 623 of the planetary gears 612 and is fixed to the rotor 604. In the example shown, the carrier 624 includes a ring that is connected to the bearings 623 of the planetary gears 612. The carrier 624 may be in two parts; a first part connecting the rotor 604 to the planetary gears 612 and a second part connected the planetary gears 612 to the clutch C1. The planetary gear set 602 provides a gear ratio that is the speed of the rotor 604 relative to the speed of the carrier 624 and output shaft 626.

The ring gear 614 is not coupled to the rotor 604 and does not rotate about the planetary gears 612 and the sun gear 610. The ring gear 614 has inwardly extending teeth that engage with the teeth of the planetary gears 612.

TABLE 2

States for planetary gear set of FIG. 6.

|  | C1 | B1 |
|---|---|---|
| 1rst Gear | X |  |
| 2$^{nd}$ Gear |  | X |

Table 2 identifies two states of the planetary gear set 602, which are provided by engaging the brake B1 or the clutch C1. Either the brake B1 or the clutch C1 is engaged, not both. When the clutch C1 is engaged, the planetary gear set 602 is in a first gear having a first gear ratio. The first gear is associated with a low speed high output torque range. The ring gear 614 is not fixed to the housing 620, but rather is connected to the brake B1 via a second carrier 625. The sun gear 610 is fixed to the planetary gears 612 and carrier 624 when the clutch C1 is fully engaged. When the clutch is engaged, the rotor speed is equal to the output speed of the output shaft 626. When the brake B1 is engaged, the planetary gear set 602 is in a second gear having a first gear ratio. The ring gear 614 is fixed to the housing 620 when the brake B1 is fully engaged. The second gear is associated with higher speeds and lower output torques than the first gear.

Figure 7B:
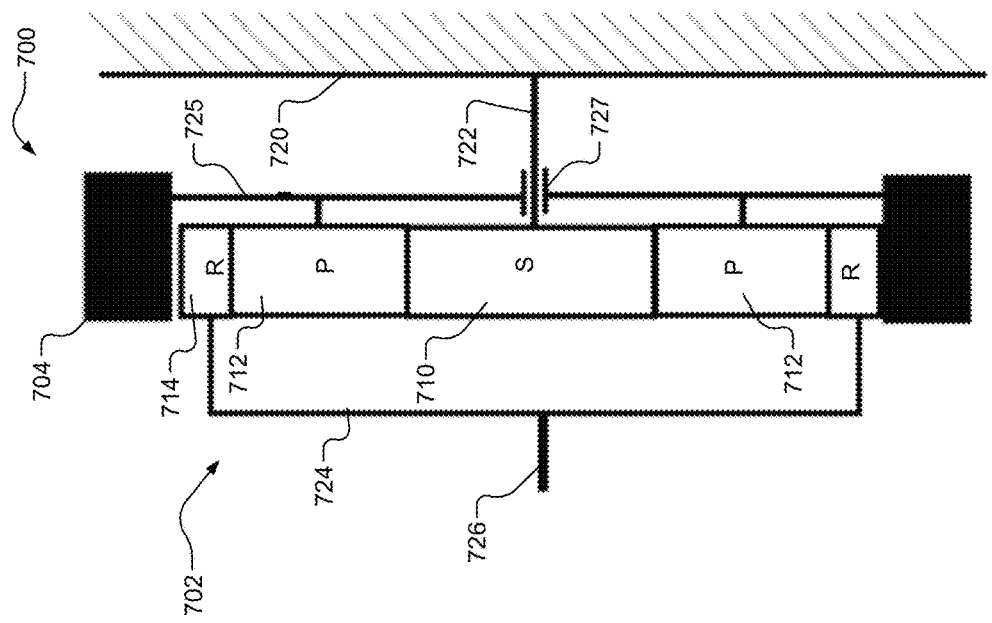
FIG. 7B is a side cross-sectional view of the portion of the axial flux motor assembly of FIG. 7A.
Figure 7A:
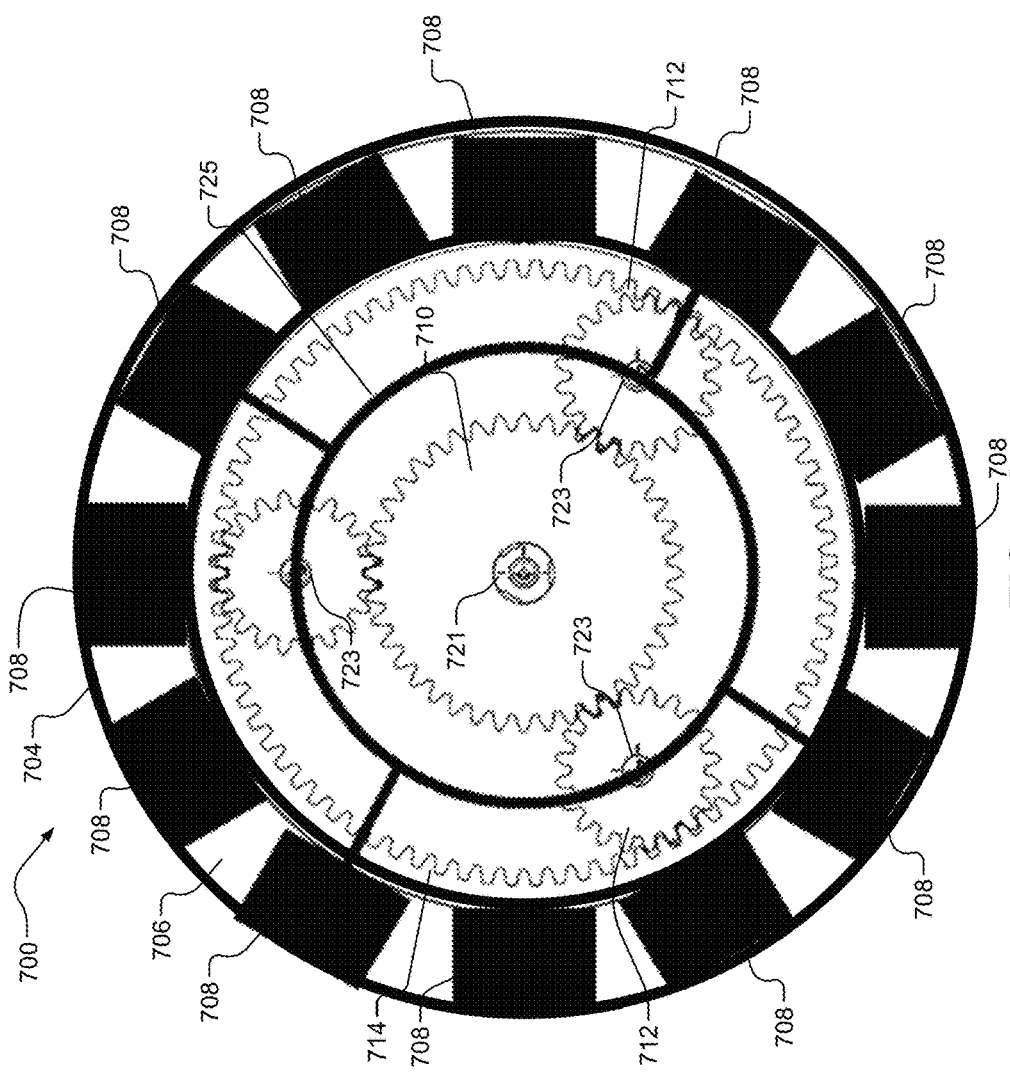
FIG. 7A is a front end view of an example of a portion of an axial flux motor assembly including a single speed planetary gear set with a carrier fixed to a rotor and a ring gear providing motor output torque in accordance with the present disclosure.

FIGS. 7A-7B show a portion 700 of an axial flux motor assembly including a single speed planetary gear set 702 implemented within an inner open area of a rotor 704. The rotor 704 includes an annular (or ring-shaped) body 706 and permanent magnets 708 mounted on the annular body 706. The planetary gear set 702 receives input torque from the rotor 704 and provides output torque that is greater than the input torque. The planetary gear set 702 includes a sun gear 710, planetary gears (e.g., three planetary gears) 712 and a ring gear 714.

The sun gear 710 is fixed in this example to a housing 720 via a connector 722 and is rotated by the planetary gears 712 on a bearing 721. The ring gear 714 is fixed to an output shaft 726 via a carrier 724 and provides motor output torque. The planetary gears 712 rotate on bearings 723 and about the sun gear 710. The planetary gears 712 include radially outward extending teeth that engage with radially outwardly extending teeth of the sun gear 710. The planetary gears 712 are fixed to the rotor 704 via a second carrier 725. In the example shown, the second carrier 725 includes a ring that is connected to the bearings 723 of the planetary gears 712. The second carrier 725 includes a hollow shaft 727 through which the connector 722 passes. The connector 722 is not connected to the hollow shaft 727. The planetary gear set 702 provides a gear ratio that is the speed of the rotor 704 relative to the speed of the carrier 724 and output shaft 726.

The ring gear 714 is not coupled to the rotor 704 and does rotate about the planetary gears 712 and the sun gear 710. The ring gear 714 has inwardly extending teeth that engage with the teeth of the planetary gears 712. The rotor 704 rotates about the connector 722 and as a result rotates the planetary gears 712 about the sun gear 710.

Figure 8B:
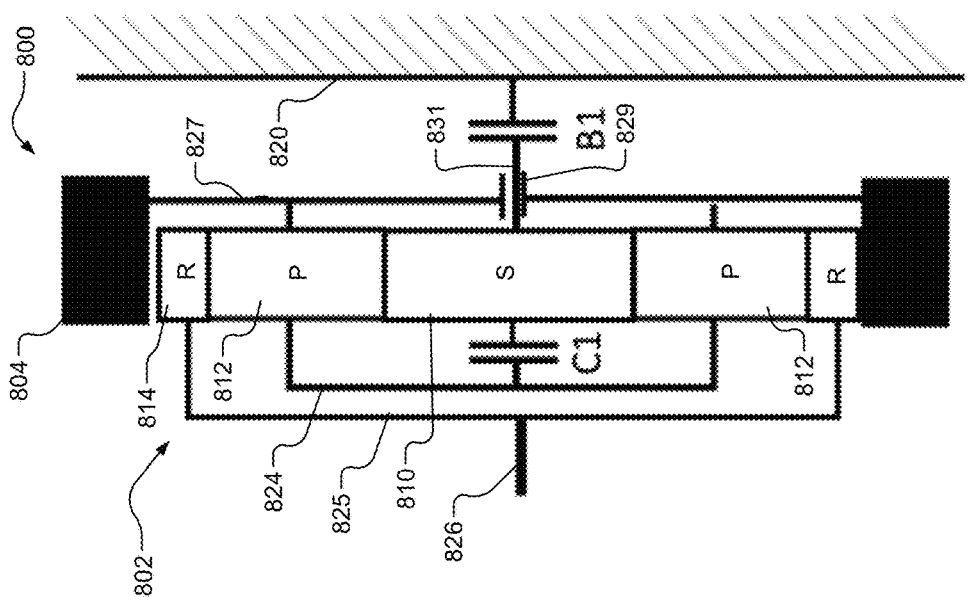
FIG. 8B is a side cross-sectional view of the portion of the axial flux motor assembly of FIG. 8A.
Figure 8A:
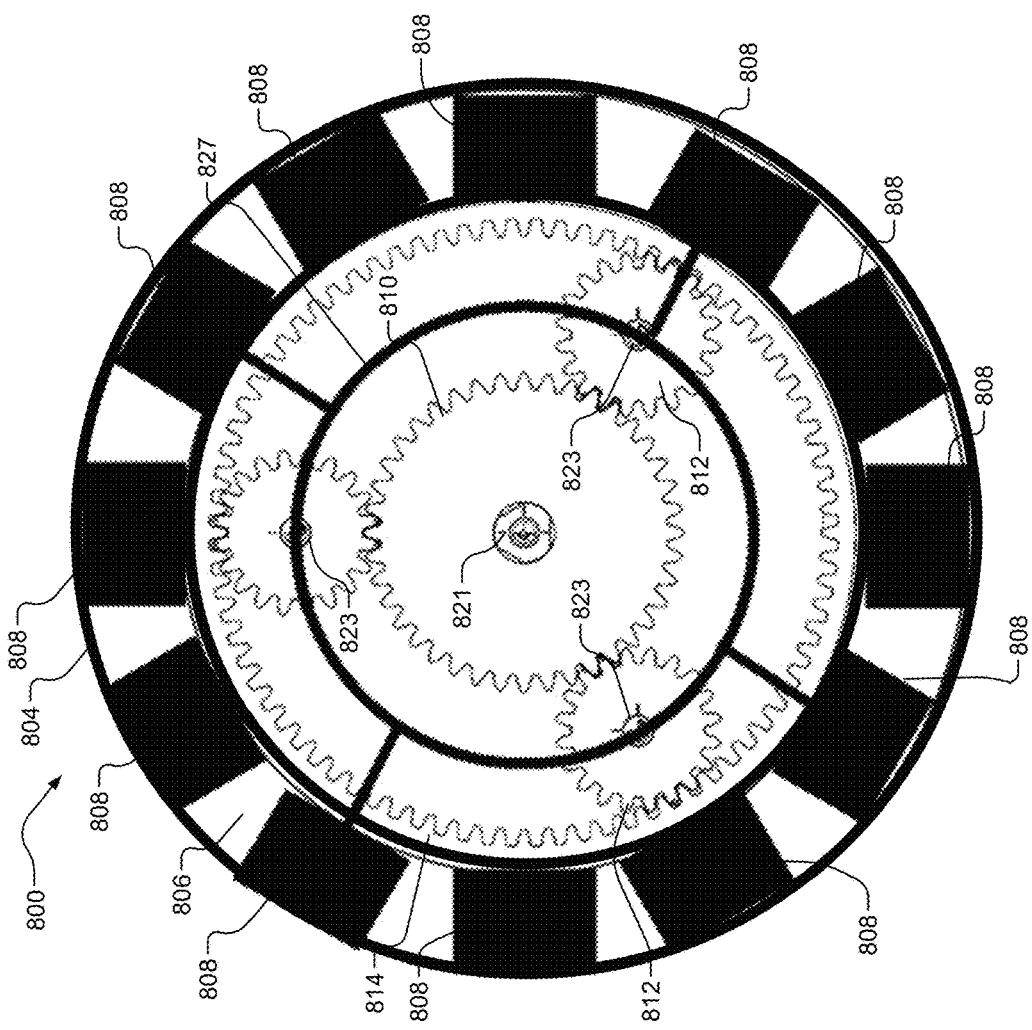
FIG. 8A is a front end view of an example of a portion of an axial flux motor assembly including a dual-speed planetary gear set with a carrier fixed to a rotor and a ring gear providing motor output torque in accordance with the present disclosure.

FIGS. 8A-8B show a portion 800 of an axial flux motor assembly that is similar to the portion 700 of FIG. 7. The axial flux motor assembly includes a dual-speed planetary gear set 802 implemented within an inner open area of a rotor 804. The rotor 804 includes an annular (or ring-shaped) body 806 and permanent magnets 808 mounted on the annular body 806. The planetary gear set 802 receives input torque from the rotor 804 and provides output torque that is greater than the input torque. The planetary gear set 802 includes a sun gear 810, planetary gears (e.g., three planetary gears) 812 and a ring gear 814.

The sun gear 810 is connected to a housing 820 via a brake B1 and is rotated by the planetary gears 812 on a bearing 821. The sun gear 810 is also connected to a first carrier 824 via a clutch C1. The ring gear 814 is fixed to an output shaft 826 via a second carrier 825 and provides motor output torque.

The planetary gears 812 rotate on bearings 823 and about the sun gear 810. The planetary gears 812 include radially outward extending teeth that engage with radially outwardly extending teeth of the sun gear 810. The planetary gears 812 are fixed to the rotor 804 via a third carrier 827. In the example shown, the carrier 824 and the carrier 827 include respective rings that are connected to the bearings 823 of the planetary gears 812. The second carrier 825 includes a hollow shaft 829 through which a connector 831 passes. The connector 831 is not connected to the hollow shaft 829, but rather connects the sun gear 810 to the brake B1. The planetary gear set 802 provides a gear ratio that is the speed of the rotor 804 relative to the speed of the output shaft 826.

The ring gear 814 is not coupled to the rotor 804 and does rotate about the planetary gears 812 and the sun gear 810. The ring gear 814 has inwardly extending teeth that engage with the teeth of the planetary gears 812. The rotor 804 rotates about the connector 831 and as a result rotates the planetary gears 812 about the sun gear 810.

TABLE 3

States for planetary gear set of FIG. 8.

|  | C1 | B1 |
|---|---|---|
| 1rst Gear | X |  |
| 2nd Gear |  | X |

Table 3 identifies two states of the planetary gear set 802, which are provided by engaging the brake B1 or the clutch C1. Either the brake B1 or the clutch C1 is engaged, not both. When the clutch C1 is engaged, the planetary gear set 802 is in a first gear having a first gear ratio. The first gear is associated with a low speed high output torque range. The sun gear 810 is fixed to the bearings 823 of the planetary gears 812 and to the carrier 824 when the clutch C1 is fully engaged and since the planetary gears 812 are connected to the rotor 804 via the third carrier 827, the sun gear 810 rotates with the rotor 804. When the clutch is engaged, the rotor speed is equal to the output speed of the output shaft 826. When the brake B1 is engaged, the planetary gear set 802 is in a second gear having a first gear ratio. The sun gear 810 is fixed to the housing 820 when the brake B1 is fully engaged. The second gear is associated with higher speeds and lower output torques than the first gear. The sun gear 810 does not rotate when fixed to the housing 820.

While a vehicle example is described below, the present application is also applicable to non-vehicle implementations. The present application is applicable to other axial flux motor applications. It will be appreciated that the concepts apply not only to electric axial flux motors that generate mechanical energy from electrical energy, but also to axial flux generators that can generate electrical energy from mechanical energy.

Figure 9:
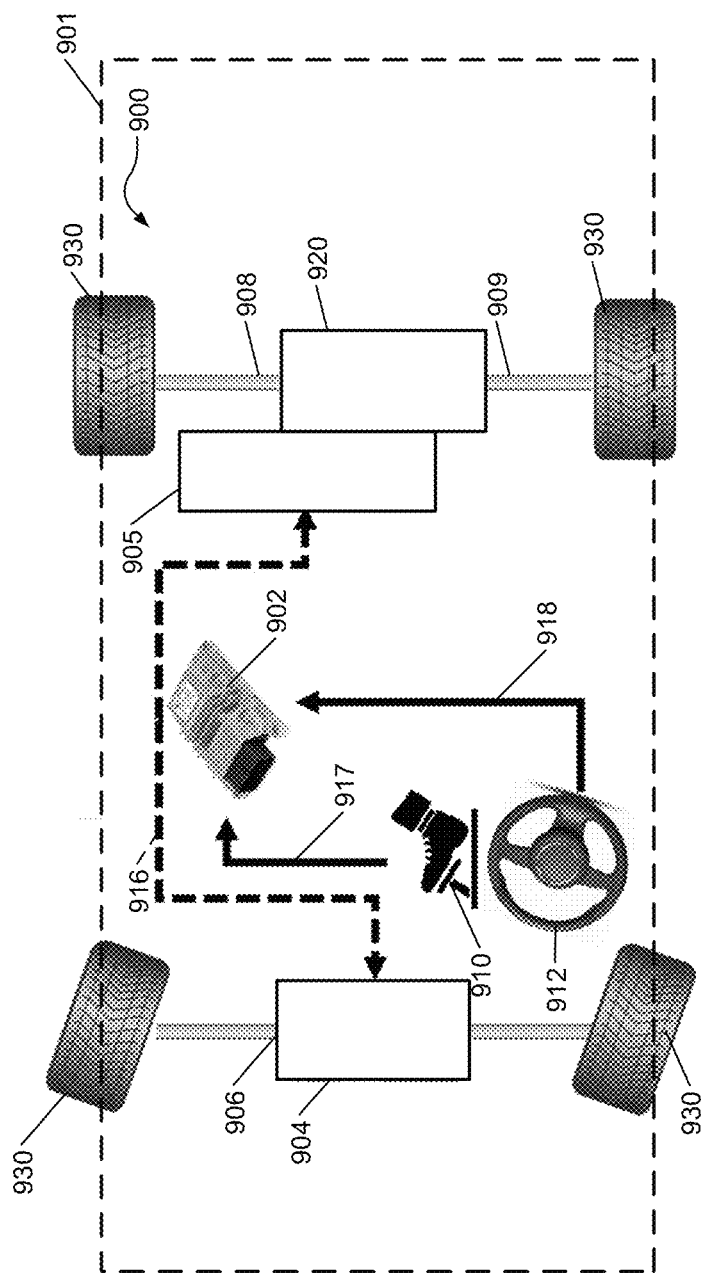
FIG. 9 is a top view of a portion of a vehicle including axial flux motor assemblies in accordance with the present disclosure.

FIG. 9 shows a portion 900 of a vehicle 901 (referred to as a vehicle system) including axial flux motors 904, 905. The vehicle system includes a control module 902, multiple axial flux motors 904, 905, a front axle 906, a rear axles 908, 909, a user input device 910, and a steering device (e.g., steering wheel) 912. The control module 902 controls distribution of output torque to the axles 906, 908 based on torque requests. As an example, the torque requests may be provided by a driver via the user input device 910 (e.g., an accelerator pedal) or via another input device, such as a steering angle (e.g., angle of a steering wheel). Distribution of output torque is represented by dashed line 916 and inputs from the user input device 910 and the steering device 912 are represented by arrows 917, 918. The control module 902 may implement the algorithms disclosed herein. In the example shown, the axial flux motor 905 is connected to the rear axles 908, 909 via a differential transfer case 920. The axles 906, 908, 909 are connected to drive tires 930.

Figure 10:
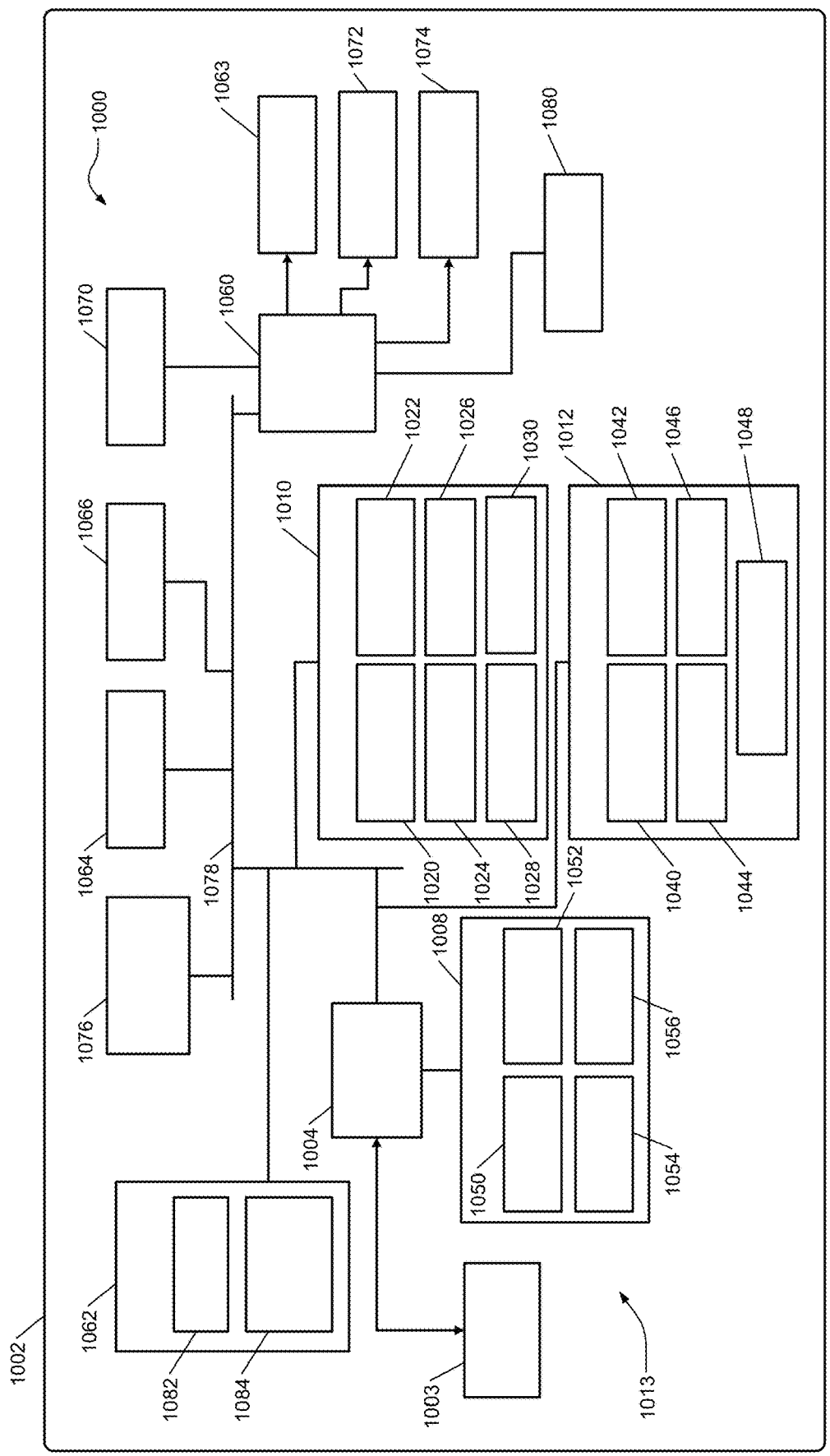
FIG. 10 a functional block diagram of a vehicle system including axial flux motor assemblies in accordance with the present disclosure.

FIG. 10 shows a vehicle system 1000 of a vehicle 1002 including one or more axial flux motors 1003. The vehicle system 1000 may operate similarly and/or be configured similarly as the vehicle system of FIG. 9. The vehicle system 1000 may include a chassis control module 1004 and torque sources, such as one or more axial flux motors 1003 and one or more engines (one engine 1008 is shown). The vehicle system 1000 may further include vehicle sensors 1010, and memory 1012. The chassis control module 1004 may control distribution of output torque to axles of the vehicle 1002 via the torque sources. The chassis control module 1004 may control operation of a propulsion system 1013 that includes the axial flux motors 1003 and the engine(s) 1008.

The sensors 1010 may include a steering sensor 1020 (e.g., a steering wheel sensor), a vehicle speed sensor 1022, accelerometers 1024, an accelerator pedal sensor 1026, a yaw rate sensor 1028 and other sensors 1030. The chassis control module 1004 controls the torque sources based on outputs of the sensors 1010.

The memory 1012 may store vehicle states 1040, tire forces 1042, driver inputs 1044, actuator constraints 1046, and other parameters and data 1048. The vehicle states 1040 may include longitudinal, lateral and vertical forces. The tire forces 1042 may indicate tire capacity levels. Driver inputs 1044 may refer to accelerator pedal positions, steering wheel angles, and/or other driver inputs. The actuator constraints 1046 may include maximum output torques of the torque sources (or how much output torque each torque source is capable of generating). The engine 1008 may include a starter motor 1050, a fuel system 1052, an ignition system 1054 and a throttle system 1056.

The vehicle 1002 may further include a body control module (BCM) 1060, a telematics module 1062, a brake system 1063, a navigation system 1064, an infotainment system 1066, an air-conditioning system 1070, other actuators 1072, other devices 1074, and other vehicle systems and modules 1076. The modules and systems 1004, 1060, 1062, 1064, 1066, 1070, 1076 may communicate with each other via a controller area network (CAN) bus 1078 and/or other suitable communication interface. A power source 1080 may be included and power the BCM 1060 and other systems, modules, devices and/or components. The power source 1080 may include one or more batteries and/or other power sources.

The telematics module 1062 may include transceivers 1082 and a telematics control module 1084. The BCM 1060 may control the modules and systems 1062, 1063, 1064, 1066, 1070, 1076 and other actuators, devices and systems (e.g., the actuators 1072 and the devices 1074). This control may be based on data from the sensors 1010.

The above-described examples allow for slimmer axial motor configurations with ring-shaped rotors and stators having high inner diameter to outer diameters ratios and providing high levels of output torque. The motors are able to provide at least as much output torque as traditional style axial flux motors of larger size. The disclosed axial flux motors have smaller permanent magnets and stator segments. The stator segments may include laminated stacks having uniformly shaped layers with uniform dimensions. The laminated stacks provide highly efficient operation and are able to easily be mass produced, as opposed to traditional trapezoidal-shaped stacks. The examples provide integrated axial flux motors with planetary gearsets to realize high speed output (high power density) and/or multiple speed function. The planetary gear sets are arranged in the inner open space of the rotors thereby leveraging the available space and minimizing the overall envelope of the axial flux motors. Some of the examples include multiple gear ratios for (i) multi-speed operation and to minimize and/or (ii) eliminate field weakening at high speeds.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An axial flux motor comprising:
a ring-shaped stator comprising a stator core and a plurality of segments arranged on the stator core, wherein each of the plurality of segments comprises a laminated stack and windings wrapped around the laminated stack;
a ring-shaped rotor defining an inner open area and comprising a body and a plurality of permanent magnets arranged on the body adjacent to and spaced from the plurality of segments; and
a planetary gear set disposed within the inner open area and configured to receive an input torque from the ring-shaped rotor and provide an output torque of the axial-flux motor, which is greater than the input torque;
a housing;
a brake; and
a clutch,
wherein:
the planetary gear set comprises a sun gear, a plurality of planetary gears and a ring gear;
the sun gear is connected to an output shaft and is connected to the planetary gears via the clutch and bearings;
the plurality of planetary gears are configured to rotate around the sun gear and are coupled to the ring-shaped rotor via a carrier and the bearings; and
the ring gear is connected to the housing via the brake.

2. The axial flux motor of claim 1, wherein a ratio between an inner diameter of the ring-shaped stator and an outer diameter of the ring-shaped stator is greater than 0.6.

3. The axial flux motor of claim 1, wherein a ratio between an inner diameter of the ring-shaped rotor and an outer diameter of the ring-shaped rotor is greater than 0.6.

4. The axial flux motor of claim 1, wherein:
each of the laminated stacks has a plurality of laminated layers; and
at least one of
the plurality of laminated layers of at least one of the laminated stacks have the same dimensions, or
a radial cross-section of one or more of the laminated stacks is rectangular-shaped.

5. The axial flux motor of claim 1, wherein the housing comprises a cage configured to hold the ring-shaped stator in a fixed location relative to the housing.

6. The axial flux motor of claim 1, wherein each layer of the laminated stacks comprises 3.2% silicon steel.

7. The axial flux motor of claim 1, wherein magnetic flux created by energizing the ring-shaped stator extends parallel to an axis of rotation of the output shaft.

8. An axial flux motor comprising:
a ring-shaped stator comprising a stator core and a plurality of segments arranged on the stator core, wherein each of the plurality of segments comprises a laminated stack and windings wrapped around the laminated stack;
a ring-shaped rotor defining an inner open area and comprising a body and a plurality of permanent magnets arranged on the body adjacent to and spaced from the plurality of segments;
a planetary gear set disposed within the inner open area and configured to receive an input torque from the ring-shaped rotor and provide an output torque of the axial-flux motor, which is greater than the input torque;
a housing;
a brake; and
a clutch,
wherein:
the planetary gear set comprises a sun gear, a plurality of planetary gears and a ring gear; and
either
the sun gear is connected to the housing via the brake and is connected to an output shaft via the clutch,
the plurality of planetary gears are configured to rotate around the sun gear and are coupled to the output shaft via a carrier and bearings, and
the ring gear is coupled to the ring-shaped rotor,
or
the sun gear is connected to the housing of the axial flux motor via the brake and is connected to a first carrier via the clutch,
the plurality of planetary gears are configured to rotate around the sun gear and are coupled to the ring-shaped rotor via a second carrier or bearings, and
the ring gear is coupled to the output shaft via a third carrier.

9. An axial flux motor comprising:
a ring-shaped stator comprising a stator core and a plurality of segments arranged on the stator core, wherein each of the plurality of segments comprises a laminated stack and windings wrapped around the laminated stack;
a ring-shaped rotor defining an inner open area and comprising a body and a plurality of permanent magnets arranged on the body adjacent to and spaced from the plurality of segments; and
a planetary gear set disposed within the inner open area and configured to receive an input torque from the ring-shaped rotor and provide an output torque of the axial-flux motor, which is greater than the input torque, wherein:
  each of the laminated stacks comprises a plurality of laminated layers stacked in a direction extending radially outward from an axis of rotation of the ring-shaped rotor; and
  a peripheral side edge of each of the plurality of laminated layers in each of the laminated stacks faces a corresponding one of the plurality of permanent magnets.

10. The axial flux motor of claim 9, wherein peripheral side edges of each of the plurality of laminated layers faces a side of a respective one of the plurality of permanent magnets.

\* \* \* \* \*